United States Patent

[11] 3,554,209

| [72] | Inventors | Richard V. Brown<br>Upland;<br>Donald G. Tweed, Riverside, Calif. |
|---|---|---|
| [21] | Appl. No. | 825,595 |
| [22] | Filed | May 19, 1969 |
| [45] | Patented | Jan. 12, 1971 |
| [73] | Assignee | Bourns, Inc.<br>a corporation of California |

[54] FLUID DIODE
4 Claims, 3 Drawing Figs.

| [52] | U.S. Cl. | 137/81.5 |
|---|---|---|
| [51] | Int. Cl. | F15c 4/00 |
| [50] | Field of Search | 137/81.5 |

[56] References Cited
UNITED STATES PATENTS

| 3,375,842 | 4/1968 | Reader | 135/81.5 |
|---|---|---|---|
| 3,461,897 | 8/1969 | Kuick | 137/81.5 |
| 3,472,256 | 10/1969 | Hartman | 137/81.5 |
| 3,472,258 | 10/1969 | Blosser, Jr. | 137/81.5 |
| 3,480,030 | 11/1969 | Bermel | 137/81.5 |
| 3,489,009 | 1/1970 | Rimmer | 137/81.5X |
| 3,500,846 | 3/1970 | Wood | 137/81.5 |
| 3,508,563 | 4/1970 | Ripley | 137/81.5 |

*Primary Examiner*—Samuel Scott
*Attorney*—Fritz B. Peterson

ABSTRACT: A device composed of fixed structure only and which structure defines an input fluid-passage and an output fluid-passage through which passages fluid normally passes through the input fluid-passage and into the output fluid-passage in a desired or forward direction, the fixed structure comprising fixed fluid-flow controlling means effective to inhibit reverse or backward flow of fluid from said output fluid-passage backwardly through the input fluid-passage in a fashion analogous to an electronic diode.

PATENTED JAN 12 1971

3,554,209

INVENTORS
RICHARD V. BROWN,
DONALD G. TWEED
BY 3,554,209

1

FLUID DIODE

BRIEF SUMMARY OF THE INVENTION

The invention has as a principal object a device having no moving parts and which is effective to permit substantially unobstructed flow of fluid in a forward direction, under the influence of a positive pressure gradient, through and out of the outlet or discharge end of an input fluid-passage or channel and into and through the inlet end of an output fluid-passage or channel and which device is further effective, incident to reversal of flow of fluid through the output fluid-passage in a direction opposite the forward direction, to inhibit or prevent backward or reverse-direction flow of fluid into and through the input fluid-passage. That object, and others made evident herein, are accomplished by providing, between the outlet or discharge end of the input fluid-passage, and the inlet end of the output fluid-passage, an interaction chamber and auxiliary chambers thereto open, and a waste passage into which fluid tending to flow in the reverse direction in the system may be discharged from the interaction chamber. The auxiliary chambers, in which one or more fluid eddies are produced in distinctive directions of rotation when fluid flows therein and therepast in the interaction chamber, are disposed with a face or side open to the interaction chamber, whereby they may be considered to be portions of an enclosed space or chamber in which fluid currents interact to effect certain fluid-flow controls or restraints. The eddy chambers are disposed, relative to the outlet of the fluid input-channel or passage and to the inlet of the fluid output-channel and to the inlet of the waste fluid-passage, so that when fluid enters the interaction chamber from the input fluid-passage, a fluid eddy is created which effectively inhibits flow into the waste channel and effectively aids in facilitating flow of fluid into the inlet of the output fluid-passage; and further so that when the direction of fluid flow through the output fluid-passage is reversed, as by excessively high back pressure applied at the outlet end of that passage, flow of fluid in the reverse direction in the input fluid-passage is inhibited and the reversely-flowing fluid is effectively diverted into the waste fluid-passage. A vent is provided, communicating with the waste fluid-passage near the inlet thereof, to facilitate return of the system to neutral or normal pressure conditions following diode action of the passages and chambers. Thus, by inhibiting flow of fluid in the backward or reverse direction, into the outlet of the input fluid-passage from the interaction chamber, the device performs in the manner of a reverse-flow check valve or electric diode despite having no moving parts. The device may be made of many parts assembled into the desired form and which parts are so shaped as to provide walls defining the noted passages and chambers, or it may be made of but one part. Preferably, and probably most economically and easily, the device in exemplary form is made of two parts. In the latter instance principal fluid-restricting walls defining chambers and passages are formed as boundaries of grooves and openings in a single part formed as a casting or molded member, and a closing wall completing the chambers and passages is formed as a flat member which is secured in fluid-tight engagement with the grooved part. Thus in the exemplary form, the device is easily and economically formed.

DESCRIPTION OF THE DRAWINGS

The accompanying drawings comprised in this specification illustrate a presently preferred elementary physical form of device embodying the novel concepts of the invention. In the drawings.

DESCRIPTION OF THE EXEMPLARY DEVICE

Figure 1:
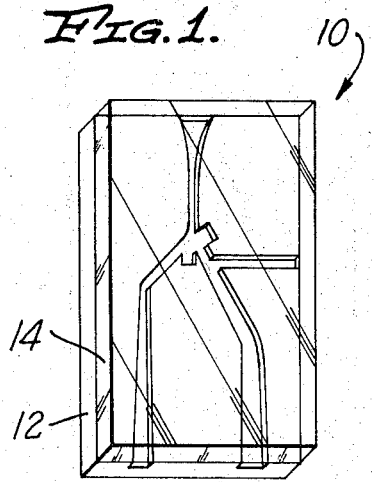
FIG. 1 is a pictorial view to no particular scale of the exemplary device as constructed from a lower opaque grooved part and an upper transparent part, the use of opaque and transparent parts aiding, inter alia, in illustrating the configurations of fluid-passages and chambers.
Figure 2:
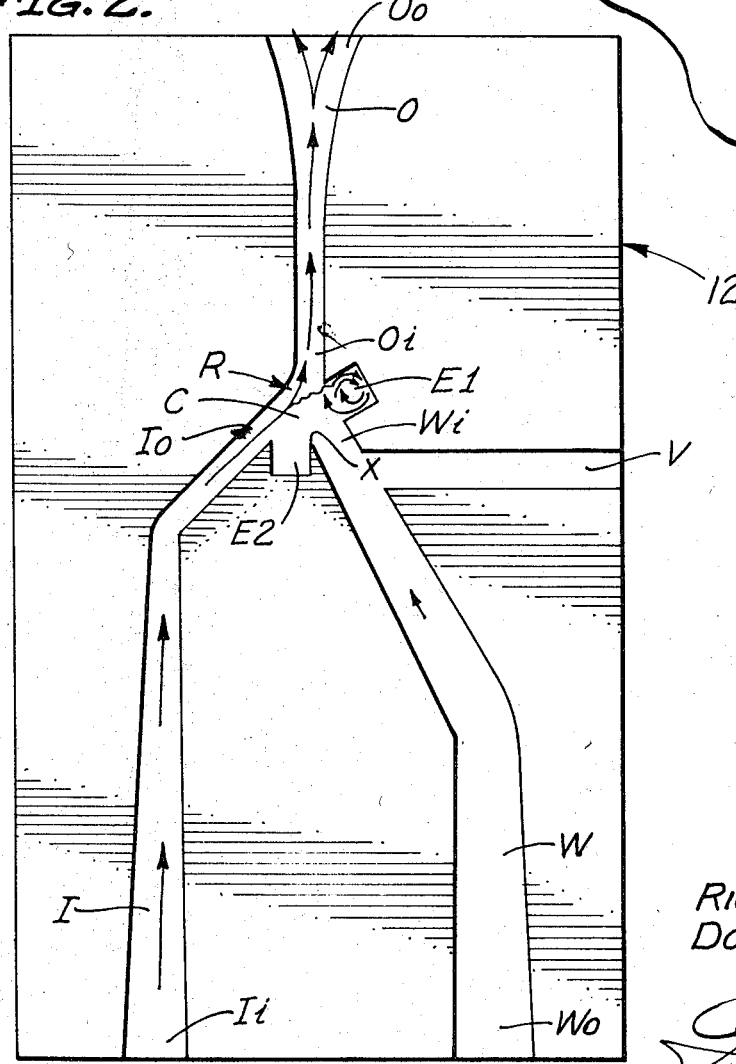
FIG. 2 is an enlarged face view of the lower part of the device depicted in FIG. 1.

As illustrated in FIG. 1, the device, denoted generally by number 10, comprises a lower platelike-shaped part 12, there shown as of opaque material, and an upper platelike part 14. The part 12 is formed, or otherwise provided, with surface channels and other unoccupied regions of space below the upper generally planar face of the part, as illustrated more in detail in FIG. 2. Conveniently the depressions are bounded by vertical sidewalls and a bottom wall or floor as illustrated, to form, when the flat cover part 14 is added, channels and chambers of generally rectangular cross section; however, as will be evident to those skilled in the fluidics art, depressions or channels of other cross-sectional configuration may be provided. In particular, and as indicated in detail in FIG. 2, and considering the cover part 14 to be in place, there are provided an input fluid-passage I, an output fluid-passage O, a waste fluid-passage W, a vent V, and a shaped region indicated generally at R with which the passages communicate. The shaped region R provides a space into which fluid is caused to flow for directional control and out of which space the fluid exhausts or flows under control exercised by local rotational fluid-flows or eddies produced automatically as a consequence of pressure gradients and fluid flow through one or a plurality of the passages. The shaped region R is comprised of a generally central region herein termed an interaction chamber as a matter of convenience. That chamber is labeled C in the drawings. The region R also includes at its periphery and open at one face to the interaction chamber C, a first eddy chamber E1, and also a second eddy chamber E2 similarly open at one face to chamber C. Eddy chamber E1 is disposed spatially between the inlet end $Oi$ of output fluid-passage O and the inlet end $Wi$ of waste fluid-passage W. Eddy chamber E2 is spatially disposed between the outlet end $Io$ of input fluid-passage I and the inlet end $Wi$ of waste fluid-passage W. The vent V is provided and spatially positioned to communicate with waste fluid-passage W at a region closely adjacent to inlet $Wi$. The eddy chamber E1 is so located, relative to a fluid current flowing into chamber C along the channel provided or formed by input fluid-passage I, that an eddy is immediately created in the eddy chamber, the eddy rotating in the relative direction indicated in FIG. 2. The eddy is initiated in an obvious manner, by an edge of the fluid stream being sheared from the main stream and being forced into a generally circular rotary stream form by the configuration of the eddy chamber. The eddy current applies lateral pressure on the principal fluid current whereby the latter, due to the Coanda effect, latches to the curved boundary of the inlet to outlet fluid-passage O. The result is production of a region of normal or slightly negative pressure in waste fluid-passage W and vent V and in adjoining portions of eddy chamber E2 and interaction chamber C. Thus the fluid exits as desired through the outlet channel provided by outlet fluid-passage O. As is evident to those skilled in the fluidics art, the noted chambers are designed as to shape, size and specific location in dependence upon pressure differentials expected to be employed. The proportions illustrated are highly effective when air is the used fluid and pressure differentials of the order of 15 pounds per square inch or less between the inlet $Ii$ and $Oo$ are employed.

Figure 3:
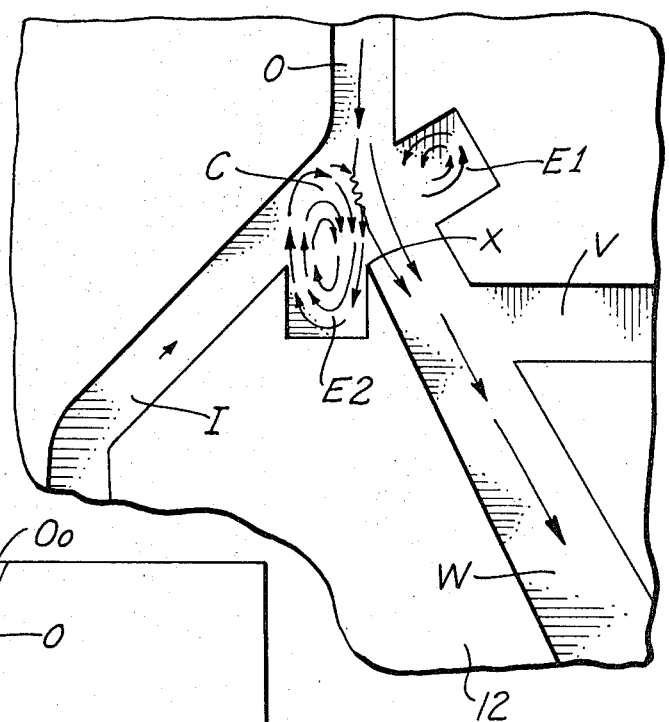
FIG. 3 is a still further enlarged view of a fragment only of the part shown in FIG. 2, useful in explaining fluid flow in the device in one phase of diode action.

When the back pressure as measured at $Oo$ is raised so as to exceed the pressure at $Ii$ (analogous to reverse-potential bias on an electronic diode), fluid commences flowing in the reverse or backward direction in passage O, into the interaction chamber C. Therein an edge portion of the reversely flowing stream is sheared off by the edge denoted by the character X in FIGS. 2 and 3, and an eddy set up in eddy chamber E2 and contiguous portions of chamber C, as indicated in FIG. 3. Additionally, an eddy which is of no operational consequence may be initiated in eddy chamber E1. The dominant effect is that of the eddy initiated in and adjacent to eddy chamber E2, which eddy, as indicated in FIG. 3, effectively diverts the reversely-flowing stream exiting from passage O into the interaction chamber, into waste fluid-passage W. Concurrently the latter eddy promotes some draft upon inlet fluid-passage I. Thus flow of fluid in the reverse direction into input fluid-passage I is inhibited and the fluid exiting into the interaction chamber C from passage O is diverted into the waste fluid-passage W which may exhaust into the atmosphere or other desired space. Vent V permits return of fluid flow in the interaction chamber to normal forward condition when the back pressure applied to passage O is relieved and forward flow into inlet O$i$ is again permitted. In general, principal fluid currents are denoted in the drawings as to both intensity and flow direction, by large arrows; and subsidiary currents similarly denoted by small or smaller arrows.

In the drawings, for purposes of facilitating illustration the device according to the invention has been shown as a single means comprising two fixed parts which may be joined to form a single part; but the chambers and passages may be formed in a one-piece casting or molding by forming the body of the device about a fugitive core formed in the shape of the passages and chambers, and the core later removed as by melting. The single means, whether formed as a single part or as a plurality of parts integrated into a unitary structure, does not have or comprise any moving parts and, by means of the wall or walls which bound or define the chambers and passages, restricts flows or passage of the fluid to desired courses and in desired directions as described. The input fluid-passage, I, is thus a restricted passage or channel through which fluid flows forwardly into a fluid-receiving space or region under the influence of applied force such as that of gravity or the influence of a positive pressure differential; the latter term having the commonly accepted technical definition, that is, a condition under which fluid moves from a space in which the pressure is equal to or greater than a determined value into a space in which the pressure is less than the determined value. As herein used, the term fluid-passage is defined as a space through which fluid under the influence of pressure differential is constrained to flow because of fluid-flow restricting or guiding means which define physical bounds or a space-boundary of the passage.

We claim:

1. A fluid diode comprising; first means including fluid-flow restricting means;
    said first means providing a fluid-interaction chamber;
    said first means providing an input fluid-passage having an exit into said fluid-interaction chamber in a forward fluid-flow direction;
    said first means providing an in output fluid-passage having an inlet leading away from said fluid-interaction chamber in a forward fluid-flow direction;
    said first means providing a waste fluid-passage having an inlet open to and leading away from said interaction chamber;
    said first means providing a first eddy-chamber open at one face of said fluid-interaction chamber adjacent said output fluid-passage inlet and adjacent to the inlet to said waste fluid-passage from said fluid-interaction chamber;
    said first means providing a second eddy-chamber open at one face to said fluid-interaction chamber between the exit of said input fluid-passage into said fluid-interaction chamber and the inlet into said waste fluid-passage; and
    whereby incident to entry of fluid into said fluid-interaction chamber from said input fluid-passage a fluid eddy is created in said first eddy-chamber the fluid in which eddy inhibits the thus-entering fluid from exiting into said waste fluid-passage and aids fluid exit from said fluid-interaction chamber into said output fluid-passage in a forward direction, and whereby incident to backward flow of fluid into said fluid-interaction chamber from said output fluid-passage a fluid eddy is produced in an eddy region including said second eddy-chamber, rotating in a direction such as to inhibit flow of fluid into said input fluid-passage from said fluid-interaction chamber.

2. A fluid diode as defined in claim 1, in which said waste fluid-passage and said outlet fluid-passage extend away from said interaction-chamber in generally opposite directions.

3. A fluid diode as defined in claim 1, in which said first means consists of a generally flat first plate having depressions in one face thereof configured to form the defined fluid passages and the defined chambers, and a second plate affixed to said one face of said first plate to complete formation and definition of the defined chambers and fluid passages.

4. A fluid diode as defined in claim 3, in which at least one of said first plate and second plate is transparent.